Sept. 4, 1962 E. R. BAISCH 3,052,326
DISC BRAKE
Filed July 15, 1959 3 Sheets-Sheet 1

EARL R. BAISCH
INVENTOR.

BY John R. Faulkner
Clifford L. Sadler
ATTORNEYS

Sept. 4, 1962     E. R. BAISCH     3,052,326
DISC BRAKE

Filed July 15, 1959     3 Sheets-Sheet 2

EARL R. BAISCH
INVENTOR.

BY John R. Faulkner
Clifford L. Sadler
ATTORNEYS

Sept. 4, 1962

E. R. BAISCH 3,052,326

DISC BRAKE

Filed July 15, 1959

EARL R. BAISCH
INVENTOR.

BY John R. Faulkner
Clifford L. Sadler
ATTORNEYS

United States Patent Office 3,052,326
Patented Sept. 4, 1962

3,052,326
DISC BRAKE
Earl R. Baisch, Riverview, Mich., assignor to Ford Motor Company, Dearborn, Mich., a corporation of Delaware
Filed July 15, 1959, Ser. No. 827,264
3 Claims. (Cl. 188—73)

The present invention relates to braking devices and more specifically to disc brakes for motor vehicles.

Hydraulically actuated disc brakes for motor vehicles are well known in the art particularly those types in which relatively small friction pieces are hydraulically pressed against a radial disc attached to the road wheel. Where the friction pieces are circular in shape, this type of brake is generally known as a spot disc brake. Hydraulically actuated spot disc brakes enjoy many advantages over more conventional brake forms such as better cooling and simplicity of construction and operation. However, as a result of their simplicity of construction, a mechanically actuated parking brake cannot be easily incorporated in their structure.

Therefore, it is an object of the present invention to provide a mechanically operated brake for a spot disc brake equipped motor vehicle for parking or emergency use which is characterized by its few operating parts and its reliability of operation.

It is another object of the present invention to provide in a motor vehicle, having hydraulic disc service brakes, an emergency brake which is mechanically actuated and is independent in operation from the service brakes.

It is a further object of this invention to provide mechanical spot disc brakes in which friction pieces are disposed on either side of a brake disc and means are provided whereby relative rotational movement between the supporting structures for the pieces draws them together in gripping action against the disc.

These and further objects of this invention will become apparent from the following description and the accompanying drawings in which.

Figure 1:
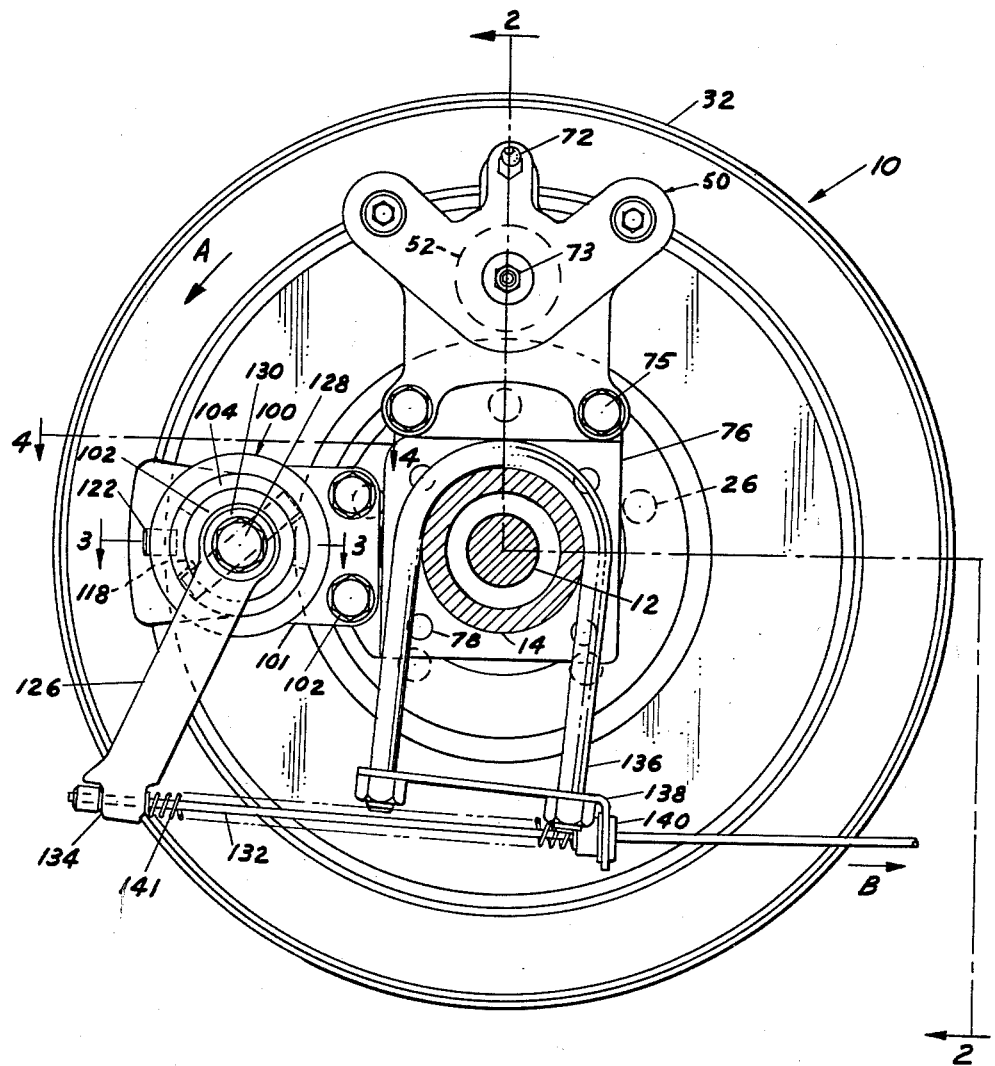
FIGURE 1 is an elevational view of a disc brake incorporating the preferred embodiment of the invention.

Referring now to the drawings for a detailed description of the present invention wherein like reference numerals identify like parts throughout the various views, a wheel assembly incorporating a spot disc brake is shown in FIGURE 1 and is indicated generally by the reference numeral 10. The present invention is shown incorporated in the rear wheels of a motor vehicle although it is obviously understood that it is equally adaptable to the front wheels of a vehicle. Further, this invention is described herein in its preferred embodiment as forming part of a parking brake system whereas it will also be understood that it is equally adaptable to a mechanically actuated service brake system and even to a hydraulically actuated service brake by certain modifications within the skill of those familiar with the art.

The wheel assembly 10 includes a rotatable axle 12 and a coaxial axle housing 14. The axle 12 has a wheel hub 16 affixed thereto and is supported for rotatable motion within housing 14 by anti-friction bearings such as ball bearing 18. Hub 16 has a radially extending flange portion 20 to which is attached an annular structural piece 22 that forms a support for the outer race of bearing 18. It also forms a support for the inside diameter of a hat-shaped brake disc 24. The disc 24 and structure 22 are secured to the radial flange 20 by appropriate means such as studs 26. The studs 26, in association with nuts 28 threadably received thereon, contain and support the inwardly directed radial flange 30 of a conventional rubber tire carrying wheel 32.

As previously stated the brake disc 24 is of a generally hat-shaped configuration having an inner radial flange 34 which is axially offset from an outwardly extending radial braking surface or rim 36 by means of an interconnecting cylindrical portion 38. The inner radial flange 34 is provided with a bolt circle 40 to complement the aforesaid studs 26 for the retention of the braking disc to the wheel structure. The rim 36 of the disc 24 is in the present embodiment shown to be of cast iron construction and several times greater in thickness than the thickness of the inner portions such as 32 and 38 of the disc 24. Brake disc 24 is of a two-part construction comprising a sheet metal stamping which forms the inner flange 34, the cylindrical extension 38 and a radial portion 42 to which the cast iron rim 36 is attached. The flange 42 is provided with an irregular or multi-dovetail peripheral edge to which the cast iron rim 36 of the braking disc 24 becomes attached when it is cast in place.

Figure 2:
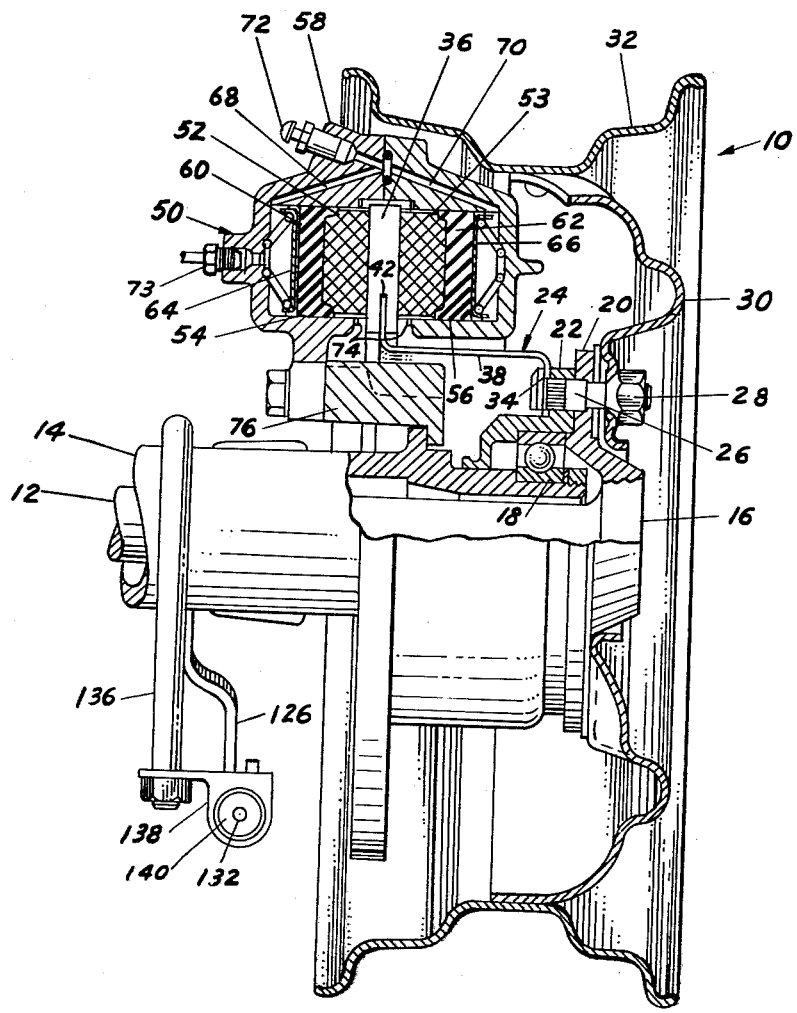
FIGURE 2 is a sectional view taken along section lines 2—2 of FIGURE 1.

Referring to FIGURE 2, a hydraulically actuated brake assembly 50 is disclosed which has a pair of opposed frictional brake lining pieces 52 and 53 disposed on opposite sides of the rim 36 of the disc 24. The linings 52 53 are circular in cross sectional shape and are contained in cylindrical bores 54 and 56 of a housing 58 that forms a part of the brake actuating mechanism 50. The brake linings 52 and 53 are formed of hard friction materials such as compositions of asbestos and are backed by members 60 and 62 that constitute pistons within the cylindrical bores 54 and 56. Spring pressed seals 64 and 66 are provided on the outer ends of the pistons 60 and 62.

Communicating with the bores 54 and 56 are a pair of hydraulic passageways 68 and 70 that have a common hydraulic fitting 72 to which the hydraulic pressure line of the vehicle's service brake system is attached. Passageways 68 and 70 communicate with the outer ends of pistons 60 and 62 respectively and permit the application of fluid pressure to their outer faces to force the friction surfaces of the linings 52, 53 against the rim piece 36 of the braking disc 24. A pair of annular seals 74 are provided about the linings 52, 53 to prevent the leakage of hydraulic fluid. A fitting 73 is also provided for purposes of bleeding entrapped air from the hydraulic system in accordance with practices that are well known in the art.

Assembly 50 is joined to the axle housing 14 by a bolted connection at 75 to bracket 76 which, in turn, is secured to the axle housing 14 by a series of bolts 78.

Operation of the hydraulically actuated disc service brake is instituted by applying hydraulic fluid pressure from the service brake system through fitting 72 from whence it communicates through passageways 68 and 70 to the outer faces of pistons 60, 64 which forces the linings 52 and 53 toward each other in gripping action against opposite faces of the rim 36 of the braking disc 24.

Figure 3:
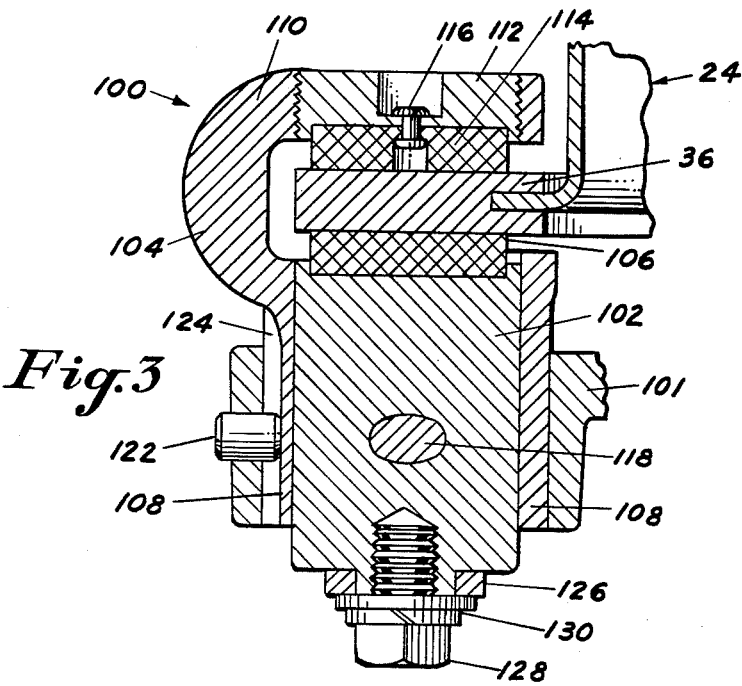
FIGURE 3 is a sectional view taken along section lines 3—3 of FIGURE 1.
Figure 4:
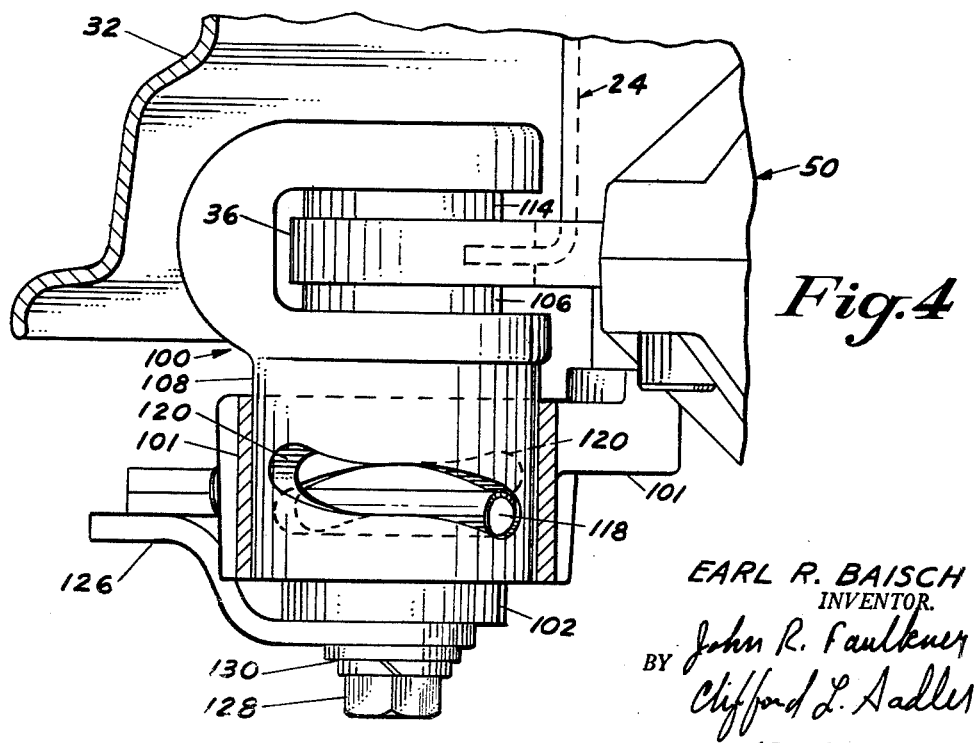
FIGURE 4 is a plan view partly in section taken along section lines 4—4 of FIGURE 1.

Referring now to FIGURES 3 and 4 a manually operated mechanically actuated parking brake is shown that is generally of the caliper type and having spot brake linings that are drawn together to trap the rim of the braking disc therebetween. The parking brake, as indicated generally by reference numeral 100, has a support 101 affixed to the bracket 76 by means of bolts 102 so that the assembly 100 is secured to the housing 14 against rotation.

Assembly 100 comprises a pair of inner and outer caliper members 102, 104 which are slidably engaged. Inner member 102 is provided with a circular frictional brake lining piece 106 affixed to one end thereof for engagement with the rim 36 of the braking disc 24. Member 104 is provided with a cylindrical portion 108 coaxial with member 102 and a hook-shaped arm portion 110 integral therewith which extends about the disc 24 to the face of the rim 36 which is opposite lining 106. Threadably received within arm 110 is a brake lining retainer 112 that has a spot-like lining piece 114 attached thereto by means such as a countersunk rivet 116. Thus, the foregoing structure provides complementary frictional pieces 106 and 114 on opposite sides of the rim 36 of the braking disc 24. The threaded engagement of retainer 112 permits independent movement of the lining 114 in order to compensate for lining wear.

The inner caliper member 102 is diametrically bored to receive a cylindrical pin 118. The outer caliper member 104 is provided with a pair of helical openings 120 which are located on opposite sides of the member 108 in complementary relationship with the pin 118. The ends of the pin 118 extend through the helical openings 120 of member 108. The outer caliper member 108 is held against rotary motion by a pin 122 which is press fitted into a bore in the support member 101. Pin 122 is received in an axial slot 124 formed in caliper member 108 thus permitting movement in an axial direction only.

The inner member 102 has a lever 126 attached thereto by means of a bolt 128 and washer 130. The extreme end of lever 126 from the assembly 100 is provided with a fitting 134 to receive an actuating cable 132. A U-bolt 136 is affixed to the axial housing 14 and carries a bracket 138 that slidably receives the cable 132 through an appropriate fitting 140. A spring 141 is provided coaxial about the cable 132 and between the lever 126 and bracket 138. This urges the lever 126 in a clockwise direction which constitutes disengagement of the parking brake as will now be described.

In operation to effect a setting of the emergency brake assembly 100, cable 132 is drawn in a right-hand direction as indicated by the arrow B by some well-known means such as a hand brake lever provided in the driver's compartment of the motor vehicle. In drawing cable 132 to the right as seen in FIGURE 1, lever 126 and the inner caliper member 102 are rotated in a counterclockwise direction. By reason of the engagement of the pin 118 with the helical slots 120, caliper members 102 and 104 will move in opposite axial directions. The left-hand lead of the helical slots 120 will force friction pieces 106 and 114 to be drawn together thereby trapping the rim 36 therebetween. Further rotational movement of lever 126 will increase the pressure of the lining pieces 106 and 114 against the rim 36 and, consequently, increase the frictional engagement between the members resulting in a braking action. The cable 132 can be drawn to the right and held in tension by appropriate ratchet means so that the disc 24 will be held by the brake linings 106 and 114 for purposes of parking the vehicle with which the present system is associated. Cable 132 may also be connected to a pedal lever and assembly 100 could then function as a conventional mechanicaly actuated service brake. As a further alternative, a hydraulic actuating cylinder could be attached to the bracket 138 and its piston used to rotate the lever 126. Appropriate hydraulic controls would permit this modification to operate as a hydraulic disc brake.

The foregoing constitutes the preferred embodiment of the present invention and certain suggested modifications; other variations may occur to those familiar with the art which will come within the spirit and scope of the following claims.

I claim:

1. A braking system for a rotatably mounted road wheel comprising a hat-shaped brake disc, said disc having an enlarged braking rim, a stationary housing, a pair of brake lining carrying caliper members mounted in said housing, said linings being disposed on the opposite side of the braking rim, one of said members having a cylindrical portion coaxial about a portion of the other member, said portions being concentric within said housing, a diametral pin received by said other member, a pair of complementary helical slots in said cylindrical portion to receive the ends of said pin, said cylindrical portion having an exterior axial groove, said housing carrying a projection which rides in said groove, a crank secured to said other member, a Bowden wire having its protective casing secured to said housing and having its inner member secured to said crank.

2. A braking system for a rotatably mounted road wheel comprising a brake disc having a braking rim, a stationary housing, a pair of brake lining carrying caliper members mounted in said housing, said linings being disposed on the opposite side of said braking rim, one of said members having a cylindrical portion coaxial about a portion of the other member, said portions being concentric within said housing, a diametral pin received by said other member, a pair of complementary helical slots in said cylindrical portion to receive the ends of said pin, said cylindrical portion having an exterior axial groove, said housing carrying a projection which rides in said groove, a crank secured to said other member, a Bowden wire having its protective casing secured to said housing and having its inner member secured to said crank.

3. A braking system for a rotatably mounted road wheel comprising a brake disc having a braking rim, a stationary housing, a pair of brake lining carrying caliper members mounted in said housing, said linings being disposed on the opposite side of said braking rim, one of said members having a cylindrical portion coaxial about a portion of the other member, said portions being concentric within said housing, a diametral pin received by said other member, a pair of complementary helical slots in said cylindrical portion to receive the ends of said pin, said cylindrical portion having an exterior axial groove, said housing carrying a projection which rides in said groove, a crank secured to said other member, actuating means secured to said crank and adapted to rotate it relative to said housing.

References Cited in the file of this patent

UNITED STATES PATENTS

| | | |
|---|---|---|
| 1,142,880 | Hartman | June 15, 1915 |
| 2,456,183 | Green | Dec. 14, 1948 |
| 2,612,968 | Hood | Oct. 7, 1952 |
| 2,800,806 | Sangster | July 30, 1957 |
| 2,843,225 | Miller | July 15, 1958 |
| 2,938,303 | Bailey | May 31, 1960 |

FOREIGN PATENTS

| | | |
|---|---|---|
| 728,376 | Great Britain | Apr. 20, 1955 |